(12) United States Patent
Bradley

(10) Patent No.: US 9,977,068 B1
(45) Date of Patent: May 22, 2018

(54) FREQUENCY MULTIPLEXER FOR USE WITH INSTRUMENTS FOR MEASURING PASSIVE INTERMODULATION (PIM)

(71) Applicant: ANRITSU COMPANY, Morgan Hill, CA (US)

(72) Inventor: Donald Bradley, Morgan Hill, CA (US)

(73) Assignee: ANRITSU COMPANY, Morgan Hill, CA (US)

( * ) Notice: Subject to any disclaimer, the term of this patent is extended or adjusted under 35 U.S.C. 154(b) by 386 days.

(21) Appl. No.: 14/806,366

(22) Filed: Jul. 22, 2015

(51) Int. Cl.
| | |
|---|---|
| *G01R 31/11* | (2006.01) |
| *G01R 23/20* | (2006.01) |
| *G01R 27/28* | (2006.01) |

(52) U.S. Cl.
CPC .............. *G01R 31/11* (2013.01); *G01R 23/20* (2013.01); *G01R 27/28* (2013.01)

(58) Field of Classification Search
None
See application file for complete search history.

(56) References Cited

U.S. PATENT DOCUMENTS

| | | | |
|---|---|---|---|
| 2,594,328 | A | 4/1952 | Marchetti |
| 4,274,047 | A | 6/1981 | Hecken |
| 4,991,098 | A | 2/1991 | Dantzler |
| 5,479,090 | A | 12/1995 | Schultz |
| 5,513,094 | A | 4/1996 | Stanley |
| 5,602,709 | A | 2/1997 | Al-Dabbagh |
| 5,706,010 | A | 1/1998 | Franke |
| 5,729,145 | A | 3/1998 | Blades |
| 5,973,568 | A | 10/1999 | Shapiro |
| 5,994,905 | A | 11/1999 | Franchville |
| 6,144,692 | A | 11/2000 | Beck |
| 6,919,782 | B2 * | 7/2005 | Sauder ............... H01P 1/2053 333/202 |
| 7,068,096 | B2 | 6/2006 | Chu |
| 7,078,990 | B1 * | 7/2006 | Patel .................. H01P 7/06 333/202 |

(Continued)

FOREIGN PATENT DOCUMENTS

| | | |
|---|---|---|
| WO | 2003030416 | 4/2003 |
| WO | 2004017516 | 2/2004 |
| WO | 2012009757 | 1/2012 |

OTHER PUBLICATIONS

Bell, et al., Range to Fault Technology, 2011, 10 pages, Kaelus.

(Continued)

*Primary Examiner* — Vincent Q Nguyen
(74) *Attorney, Agent, or Firm* — Tucker Ellis LLP

(57) ABSTRACT

A device for combining two or more tones generated by a measuring instrument for output to a port includes a combiner point, a transmission path extending from the combiner point to the port, two or more signal source filters each adapted to be connected to a respective signal source of the measuring instrument and one or more receiver filters each adapted to be connected to a receiver of the measuring instrument. Each of the signal source filters and receiver filters includes a cavity, a resonator arranged within the cavity and connected with the combiner point at a distance of one quarter of a wavelength of a signal having a center frequency of the passband of the filter, and a solid dielectric filter connected with the cavity.

13 Claims, 5 Drawing Sheets

(56) References Cited

U.S. PATENT DOCUMENTS

| | | |
|---|---|---|
| 7,103,114 B1 | 9/2006 | Lapierre |
| 7,469,190 B2 | 12/2008 | Bickel |
| 7,511,472 B1 | 3/2009 | Xia |
| 7,598,714 B2 | 10/2009 | Stanley |
| 7,629,764 B2 | 12/2009 | Shoemaker |
| 7,696,850 B2 | 4/2010 | Stanford |
| 7,696,940 B1 | 4/2010 | MacDonald |
| 8,058,880 B2 | 11/2011 | Bradley |
| 8,294,469 B2 | 10/2012 | Bradley |
| 8,498,582 B1 | 7/2013 | Bradley |
| 8,666,322 B1 | 3/2014 | Bradley |
| 8,816,672 B1 | 8/2014 | Bradley |
| 8,903,324 B1 | 12/2014 | Bradley |
| 2002/0030871 A1 | 3/2002 | Anderson |
| 2002/0094785 A1 | 7/2002 | Deats |
| 2002/0097036 A1* | 7/2002 | Bradley .......... G01R 23/16 324/76.19 |
| 2003/0232600 A1* | 12/2003 | Montgomery ...... H01Q 1/246 455/67.11 |
| 2005/0141602 A1 | 6/2005 | Hyun |
| 2006/0202900 A1 | 9/2006 | Simile |
| 2009/0096466 A1 | 4/2009 | Delforce |
| 2009/0124122 A1 | 5/2009 | Stanford |
| 2009/0125253 A1 | 5/2009 | Blair |
| 2010/0029553 A1 | 2/2010 | Scheibel |
| 2010/0052652 A1 | 3/2010 | Mitchell |
| 2010/0085061 A1 | 4/2010 | Bradley |
| 2010/0164504 A1 | 7/2010 | Bradley |
| 2010/0194382 A1 | 8/2010 | Montena |
| 2010/0295533 A1 | 11/2010 | Kuga |
| 2011/0140804 A1* | 6/2011 | Fan ............... H01P 1/20372 333/134 |
| 2012/0086612 A1 | 4/2012 | Linehan |
| 2013/0071112 A1 | 3/2013 | Melester |
| 2013/0182753 A1 | 7/2013 | Delforce |
| 2014/0146866 A1 | 5/2014 | Strachan |
| 2016/0033562 A1* | 2/2016 | Carney ............ G01R 23/20 324/624 |

OTHER PUBLICATIONS

Lui, Passive Intermodulation Interference in Communication Systems, Jun. 1990, pp. 109-118, vol. 2, Issue 3, Electronics & Communication Engineering Journal.

Eron, PIM Requirements for Low Power Wireless Components and Subsystems, White Paper, 4 pages, Microlab.

Hartman, et al., PIM Test Power Levels for Mobile Communications Systems, 2012, 8 pages, Kaelus.

Holzman, Essentials of RP and microwave grounding, Chapter 4: Transmission Line Transitions, 2006, 31 pages, Artech House, Inc.

\* cited by examiner

FREQUENCY MULTIPLEXER FOR USE WITH INSTRUMENTS FOR MEASURING PASSIVE INTERMODULATION (PIM)

BACKGROUND

Technical Field

The present invention relates generally to systems and methods for measuring the electrical response of a device under test (DUT) and specifically to devices and methods for multiplexing signals to and from a system for measuring the electrical response of the DUT.

Related Art

Passive intermodulation (PIM), resulting from the non-linear mixing of two or more frequencies in a passive device such as a connector or cable, can be problematic for operators of wireless communication systems. PIM can appear, for example, as existing equipment ages, when new carriers are co-located, when new carriers are overlaid into old antenna runs, and when new equipment is installed. In a cellular network, PIM creates interference that can reduce a receive sensitivity of a cell or block calls. This interference can affect the cell that creates it, as well as other nearby receivers. PIM can be a serious issue for operators of wireless communication systems wanting to maximize a system's reliability, data rate, capacity, and return on investment.

High-speed digital data communications have further increased the problematic nature of PIM. PIM has surfaced as a problem for wireless data transmission using modern standards including Long-Term Evolution (LTE), Global System for Mobile Communications (GSM), Advanced Wireless Service (AWS) and Personal Communication Service (PCS) standards. As cell usage and throughput grow, the peak power produced by new digital modulations increases dramatically, potentially contributing heavily to PIM problems. On-site experiments have shown significant decreases in download speeds linked to slight increases in PIM. For example, drive tests have revealed an approximate 18% drop in download speed when residual PIM level is increased from −125 dBm to −105 dBm.

PIM can be reduced or eliminated by replacing or correcting sources of PIM, including faulty cables or connectors. Test systems can be utilized to detect PIM in a communication system and enable a technician to locate the source of the detected PIM. A test system to measure PIM will typically create signals at two (or more) different frequencies, amplify them and provide them, for example, through cables connecting base stations to antennas for transmitting and receiving signals. A return signal carrying PIM is filtered to select a desired test frequency harmonic where PIM is detectable, and measurements of the magnitude of a PIM and the distance-to-PIM are provided to the technician using the test system.

SUMMARY

In accordance with an embodiment, a device for combining two or more tones generated by a measuring instrument for output to a port includes a combiner point, a transmission path extending from the combiner point to the port, two or more signal source filters each adapted to be connected to a respective signal source of the measuring instrument and one or more receiver filters each adapted to be connected to a receiver of the measuring instrument. Each of the signal source filters and receiver filters includes a cavity, a resonator arranged within the cavity and connected with the combiner point at a distance such that the filter is substantially an open circuit to a signal having a frequency within the passband of the filter and substantially a short circuit to a signal having a frequency outside of the passband of the signal source filter, and a solid dielectric filter connected with the cavity.

In accordance with an embodiment, a resonator arranged within the cavity of a filter is connected with the combiner point at a distance of one quarter of a wavelength of a signal having a center frequency of the passband of the filter. In accordance with an embodiment, the resonator is connected with the combiner point by a tap such that the combiner output impedance is 50 ohms.

In accordance with an embodiment, the solid dielectric filter of the two or more signal source filters and the one or more receiver filters is a ceramic filter. In accordance with an embodiment, the device includes a body within which is formed the cavity of each of the two or more signal source filters and the one or more receiver filter. The body further includes pockets for receiving the solid dielectric filter of each of the two or more signal source filters and the one or more receiver filter and through which the solid dielectric filter is connected with an associated cavity.

BRIEF DESCRIPTION OF THE DRAWINGS

Further details of the present invention are explained with the help of the attached drawings in which.

DETAILED DESCRIPTION

The following description is of the best modes presently contemplated for practicing various embodiments of the present invention. The description is not to be taken in a limiting sense but is made merely for the purpose of describing the general principles of the invention. The scope of the invention should be ascertained with reference to the claims. In the description of the invention that follows, like numerals or reference designators will be used to refer to like parts or elements throughout. Like parts or elements may be described in a single embodiment, or they may be described in multiple embodiments.

Figure 1:
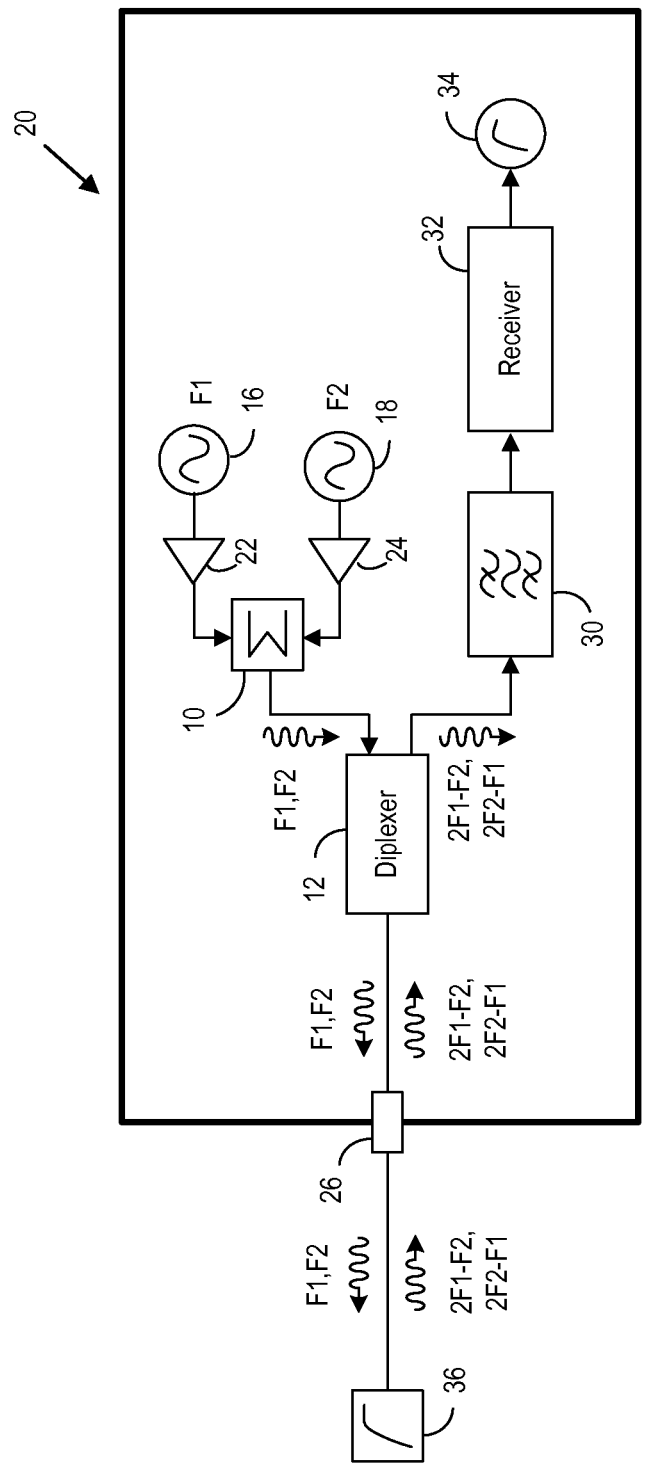
FIG. 1 is a block diagram of components of an instrument for measuring PIM, in accordance with the prior art.

FIG. 1 is a simplified, block diagram of an instrument 20 usable for measuring passive intermodulation (PIM) in accordance with the prior art (referred to hereinafter as a measuring instrument). The measuring instrument comprises two signal sources, with a first signal source 16 capable of generating a first tone at frequency F1 and a second signal source 18 capable of generating a second tone at frequency F2. The tones generated by the signal sources are amplified 22, 24 and provided to a combiner 10 (also referred to as a 3 dB power divider) to create a test signal with frequency components F1 and F2 at the combiner output. A diplexer 12 passes the test signal to a test port 26 connected with a device, system and/or network (referred to hereinafter as a device-under-test (DUT)).

Unwanted signals related to PIM can be produced when multiple frequency components are allowed to share the same signal path in a nonlinear transmission medium. Where the DUT includes a PIM source 36, a reflected signal (also referred to as a reverse signal) can be produced by the test signal and returned to the measuring instrument. PIM produced in response to a test signal having two frequency components F1, F2 can include components at multiple different frequencies predictable using a pair of formulas including the expressions nF1-mF2 and nF2-mF1, where the constants n and m are positive integers. Generally, the third, fifth and seventh order components are the PIM components of concern. The third order response can be particularly problematic, resulting in the highest power components at frequencies 2F1-F2 and 2F2-F1.

During PIM measurement, a reflected signal received at the measuring instrument having a frequency corresponding to a PIM component is passed through the diplexer and is mixed, down converted and filtered (with components combined in block 30 for simplification) to obtain an intermediate frequency (IF) signal. The IF signal is amplified, the magnitude of the IF signal is detected by a receiver 32 and a measurement of PIM 34 is obtained.

Measuring instruments that use a typical combiner, such as a 3 dB power divider, to combine two (or more) amplified tones of different frequency into a test signal that is passed to a diplexer can experience a significant drop in power at the combiner. For example, combining two amplified tones of different frequencies with a 3 dB power divider can result in a loss of half of the power of the tones in the combiner. As a result, in order to produce a test signal with two 40 W tones at the test port, the measuring instrument can require that the tones first be amplified to 80 W, with an internal load of the combiner dissipating 40 W for each tone.

Figure 2:
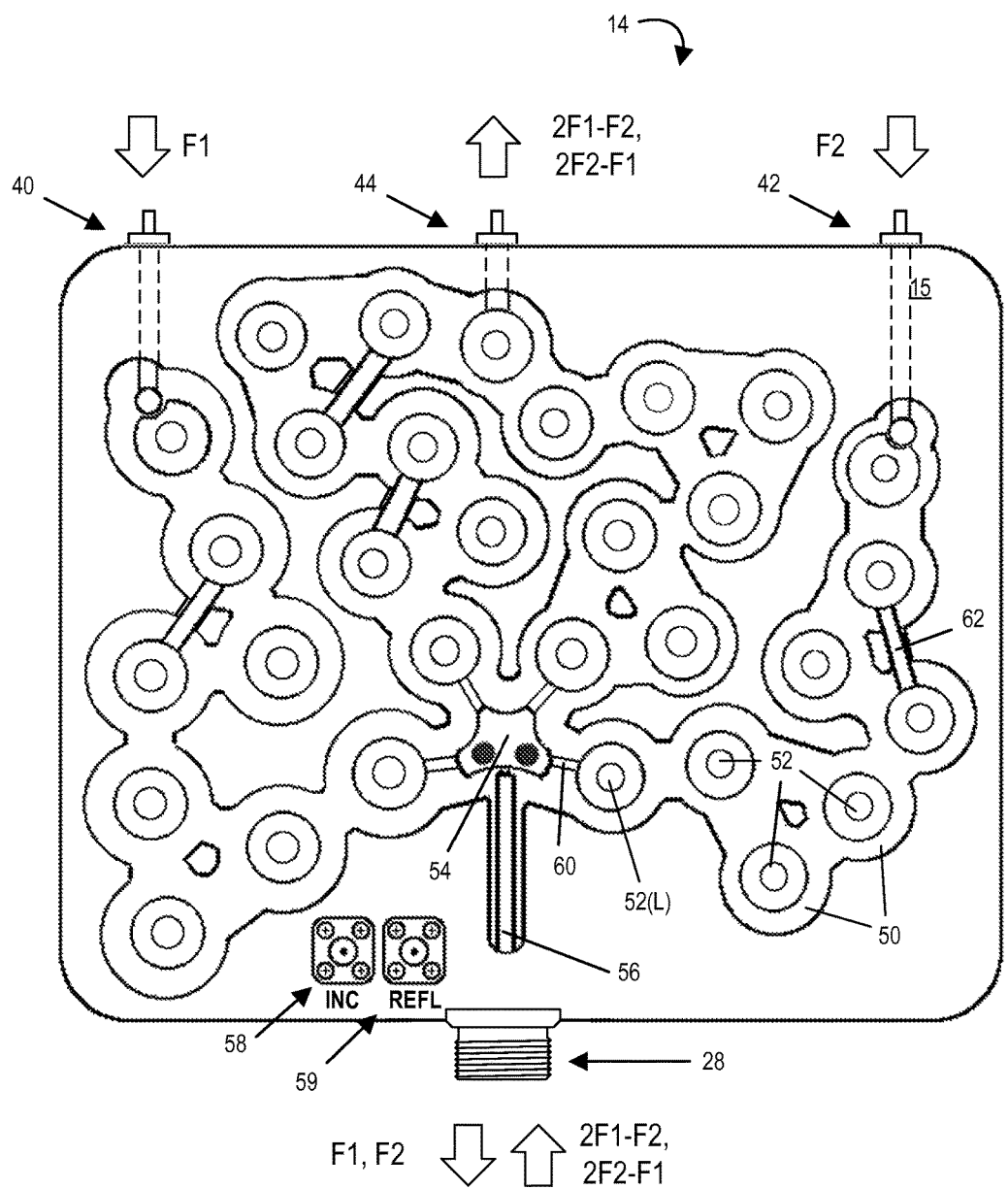
FIG. 2 illustrates a triplexer for use with an instrument for measuring an electrical response in a device under test (DUT).

Referring to FIG. 2, the combiner and diplexer alternatively can be substituted with a triplexer 14 that receives as input each of the two tones F1, F2 generated by the first signal source and the second signal source, outputs a test signal comprising the two tones as components to the test port, and passes reflected signal components 2F2-F1, 2F1-F2 produced at nonlinearities in a DUT to the receiver of the measuring instrument. The two tones provided to the triplexer and the reflected signals received from the triplexer are separated by cavity filters that prevent signal leakage to the amplifiers of the measuring instrument that amplify the two tones. As a result, power loss as compared with the combiner is reduced through use of the triplexer.

As shown, a coaxial cable is connectable at a test port 28 of the triplexer for transmitting signals to a DUT and for receiving reflected signals produced in response to the presence of a nonlinearity (i.e. a PIM source) at the DUT. The triplexer is connectable with the first signal source at a first inlet 40, the second signal source at a second inlet 42 and the receiver at an outlet 44. Each of the first inlet, second inlet and outlet is connected with the test port via a respective cavity filter having a very high Q-factor resulting from the use of a series of tuned cavities and resonators. The filters have non-overlapping passbands.

As shown, the filters can be formed in a metal block 15 and combined at a combiner point 54 connected to the test port by a transmission line 56. Incident and reflected signals can be coupled from the transmission line and sampled at respective ports 58, 59 of the triplexer, for example when measuring scattering (S-) parameters for a DUT. The metal block can comprise a bimetallic structure so as to increase the operating temperature range of the filters. Further, the metal block can be plated with a material selected to suppress the production of PIM internal to the cavities.

Each cavity 50 from a filter includes a resonator 52 arranged apart from a resonator of an adjacent cavity of the filter at a distance of substantially a quarter wavelength for a center frequency of the passband for which the filter is designed. A last resonator 52(L) in the filter is physically connected with the combiner point by a tap 60 a distance of substantially a quarter wavelength for the center frequency of the passband. The tap is the point along the combiner point that appears as 50 ohms for the combiner output impedance. Each filter is tuned by tuning each of the resonators within the series of cavities to adjust the impedance of the resonators. For example, in some triplexers, a threaded rod can be advance or retreated within the resonator to adjust impedance of the resonator. Optionally, two or more of the cavities of a filter can include bridging 62 to further adjust performance.

The respective filters are designed to substantially appear as a short to a signal having a frequency outside of the passband of the filter, and to substantially appear as an open to a signal having a frequency within the passband. For example, as a first tone having a frequency within the passband of a first filter connected with the first signal source enters the first filter, the cavities of the first filter resonate at the first tone and the first tone is passed to the combiner point. However, if a second tone outside of the passband of the first filter enters the cavity of the last resonator of the first filter via the combiner point, current will circulate in the resonator and the second tone will be attenuated as it enters the adjacent cavity of the first filter where it will be further attenuated as it passes to the next adjacent cavity of the first filter, and so on.

The filters can be designed to have narrow passbands. For example, a filter connected to the first inlet and designed to have a 5 MHz passband centered at 1935 MHz can be combined with a filter connected to the second inlet and designed to have a 5 MHz passband centered at 1950 MHz and a pair of filters (as shown) connected to the outlet and designed to have similarly narrow passbands centered at 1920 MHz and 1965 MHz, i.e. the two third order harmonics that would be produced by two tones generated at the center frequencies of the filters connected to the first and second inlets. Each filter will substantially appear as a short to a signal outside of the passband of the filter, isolating the inlets and outlet from one another.

The triplexer as described above is a three-port to one-port multiplexer. Multiplexers for measuring instruments that generate three or more tones and receive one or more reflected signals can be similarly constructed, for example a four-port to one-port quadruplexer or a five-port to one-port quintaplexer can be similarly constructed. Multiplexers comprising cavity filters can be referred to as "lossless", in that such multiplexers can be used to combine signals generated and amplified within the measuring instrument without significant attenuation of the signals at the output of the multiplexer.

Figure 3:
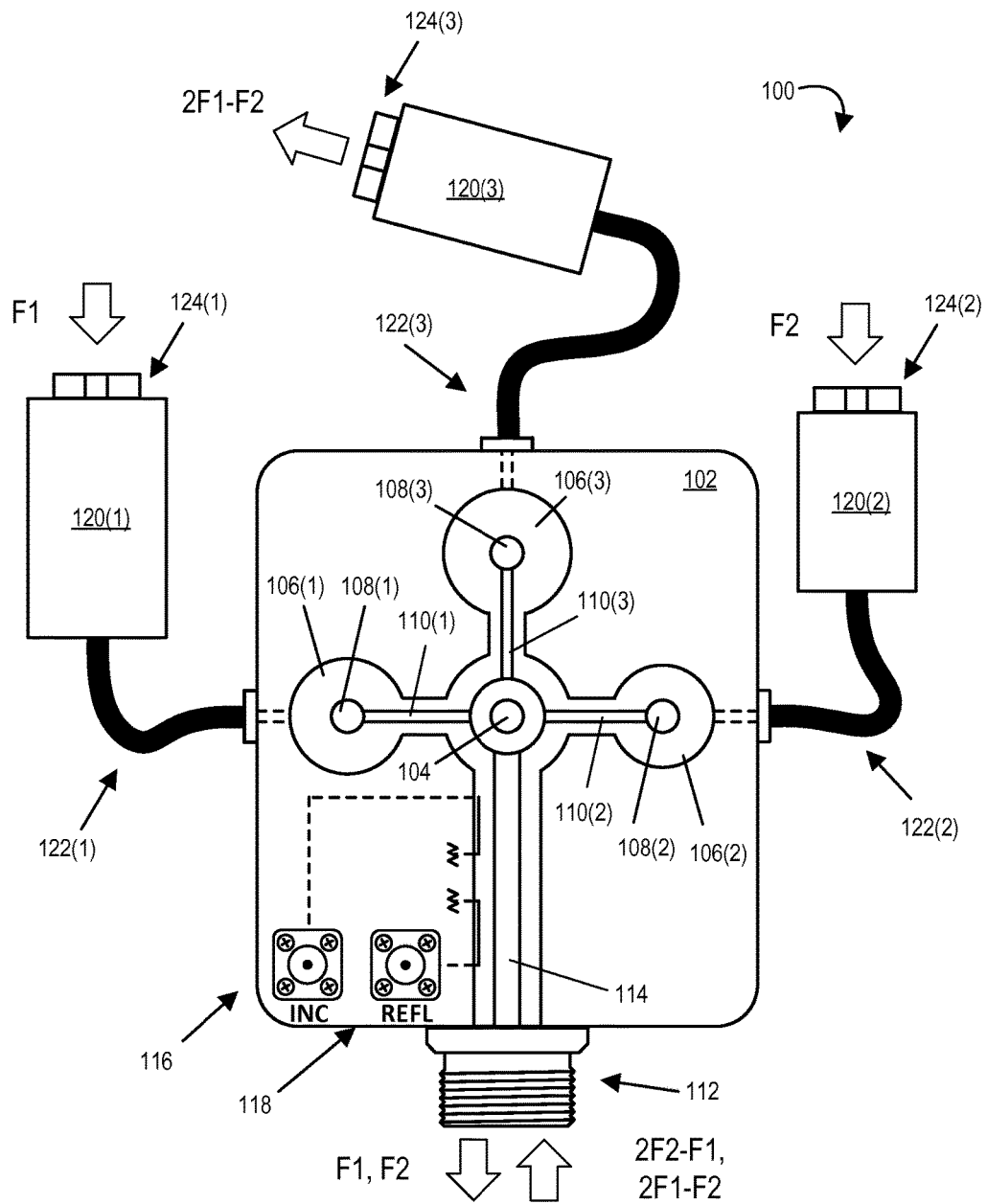
FIG. 3 illustrates an embodiment of a multiplexer for use with an instrument for measuring an electrical response in a DUT, in accordance with the present invention.

FIG. 3 illustrates an embodiment of a multiplexer 100 for use with a measuring instrument, in accordance with the present invention. As shown, the multiplexer is a triplexer having a three-port to one-port configuration, but in other embodiments can have some other configuration. The multiplexer comprises two filters each connectable with a signal source of the measuring instrument and a filter for an output connectable with a receiver of the measuring instrument. The filters have separate, non-overlapping passbands and each include both a cavity portion and a solid dielectric portion.

In accordance with an embodiment, the cavity portion of each filter can include a single cavity 106(1), 106(2), 106(3) with a resonator 108(1), 108(2), 108(3) arranged within the cavity and connected with a combiner point 104, for example by a tap 110(1), 110(2), 110(3). Each resonator is connected with the combiner point by a distance of substantially a quarter wavelength for the center frequency of the passband of the filter to which the resonator belongs. Alternatively, each resonator can be connected at some other distance that produces a short out of band, such as a distance of three-quarter wavelength for the center frequency of the passband of the filter. The combiner point combines two tones F1, F2 into a test signal for output to a test port 112 via a transmission line 114 and can receive and pass a reflected signal 2F1-F2 corresponding to a third order harmonic of the test signal to the receiver.

In accordance with an embodiment, the cavities and combiner point are formed in a metal block 102. Incident and reflected signals can be coupled from the transmission line and sampled at respective ports 116, 118 of the multiplexer, for example for use in measuring scattering (S–) parameters for a DUT. The metal block can comprise a bimetallic structure so as to increase the operating temperature range of the filters. Further, the metal block can be plated with a material selected to suppress the internal production of PIM.

In accordance with an embodiment, the solid dielectric portion of each filter can include a discrete solid dielectric filter 120(1), 120(2), 120(3), such as a ceramic filter, connected with a cavity portion of the filter. Solid dielectric filters typically have soft out-of-band responses relative to cavity filters. If solid dielectric filters are connected directly to a combiner point, the solid dielectric filters can provide insufficient isolation from signals having frequencies out of their passbands. Rather than appearing as a short to a signal having a frequency out of a passband, a solid dielectric filter can appear to have some known impedance that will allow the signal entering the solid dielectric filter from the combiner point to produce intermodulation signals when interacting with a signal within the passband that is being passed by the solid dielectric filter to the combiner point. The intermodulation signals can be received at the receiver, resulting in a measurement of PIM that is not actually attributable to the DUT. The signal outside of the passband can also attenuate a signal within the passband resulting in dissipation of power within the solid dielectric filter.

In accordance with an embodiment, the cavity portion and the solid dielectric portion of each filter can be combined to provide improved isolation relative to a solid dielectric filter alone and relative to a typical combiner. A second tone generated by the second signal source of the measuring instrument and entering the combiner point will enter the cavity of the resonator of the first filter connected with the first signal source. Because the second tone is outside of the passband of the first filter, current will circulate in the resonator, and the second tone will be attenuated such that most of the second tone is rejected at the cavity portion of the first filter. The second tone can be sufficiently attenuated such that the solid dielectric portion will reject most of the remaining signal.

In accordance with an embodiment, each solid dielectric filter is connected with the metal block within which is formed the cavity portion of each filter. For example, each solid dielectric filter can be connected to an associated cavity through an inlet in the metal block by a cable 122(1), 122(2), 122(3). Further, each solid dielectric filter can be connected with the measuring instrument by a cable or some other transmission medium for communicating the signal. For example, as shown the solid dielectric filters each include a microstrip 124(1), 124(2), 124(3) for communicating signals to and from the measuring instrument. In other embodiments, a solid dielectric filter can be connected with a cavity and with a measuring instrument via some other transmission medium capable of communicating a signal within a passband of the filter at the powers generated by the measuring instrument.

Because the cavity portion of the embodiment of FIG. 3 includes a single cavity, a footprint of the metal block can be reduced when compared with the footprint of the metal block for the triplexer of FIG. 2, for example. Multiplexers in accordance with embodiments of the present invention can be made smaller and lighter than multiplexers relying on cavity filters consisting of a series of cavities for providing signal isolation. Time spent tuning multiplexers in accordance with embodiments of the invention can also be reduced over time spent tuning multiplexers relying on cavity filters consisting of a series of cavities. As will be appreciated, a single cavity and resonator can be tuned more quickly than a series of cavities and associated resonators. The tuning of a series of cavities can be slowed by additional adjustments of cavities and resonators in response to the tuning of other cavities and resonators in the series of cavities. Solid dielectric filters, for example, are typically tuned using a laser, permitting tuning to be performed more quickly and precisely for the solid dielectric portion of filters in accordance with embodiments.

Figure 4:
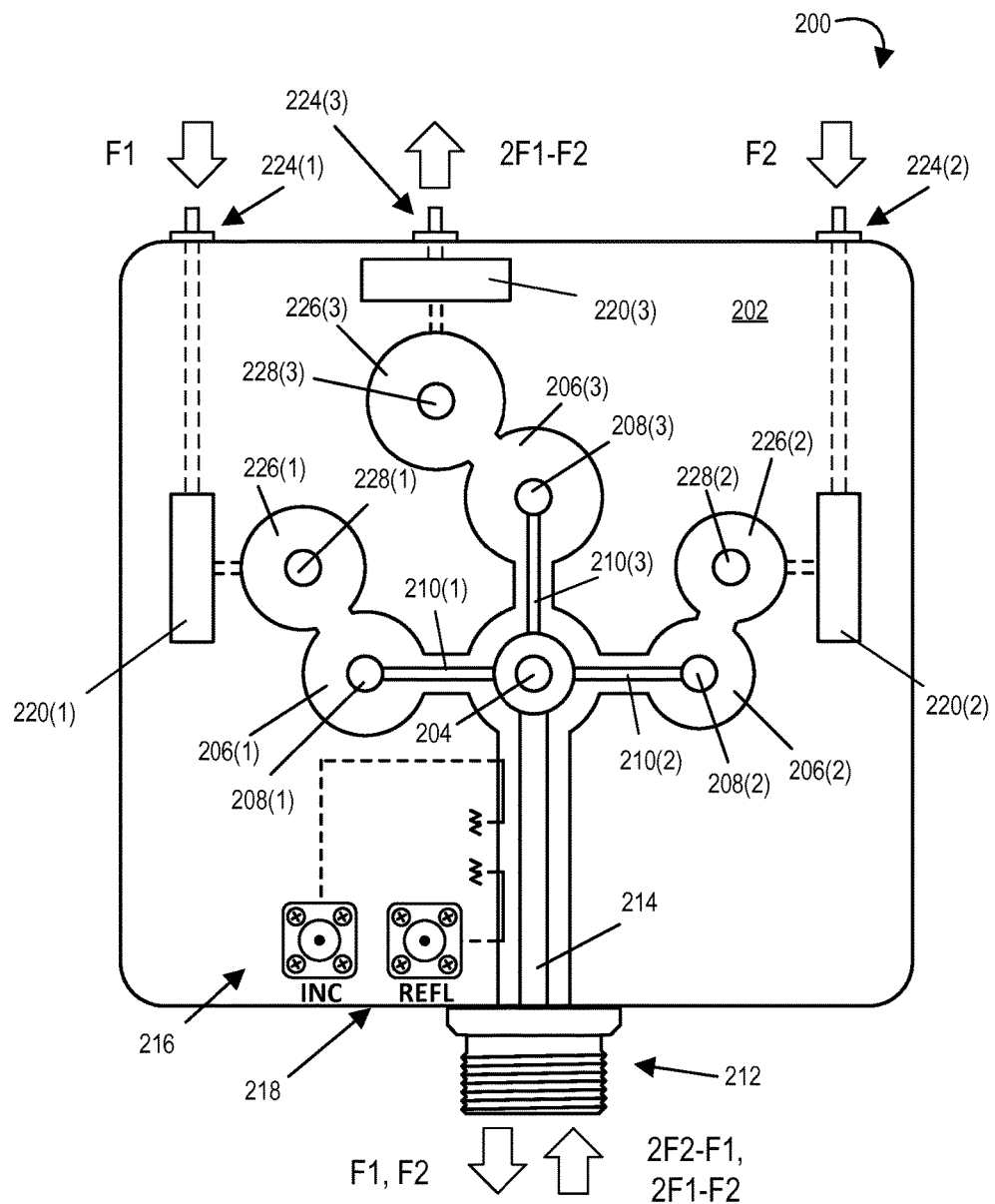
FIG. 4 illustrates an alternative embodiment of a multiplexer for use with an instrument for measuring an electrical response in a DUT, in accordance with the present invention.

FIG. 4 illustrates a multiplexer 200 for use with a measuring instrument, in accordance with an alternative embodiment. As shown, the multiplexer is a triplexer having a three-port to one-port configuration, but in other embodiments can have some other configuration. The multiplexer comprises two filters each connectable with a signal source of the measuring instrument and a filter for an output connectable with a receiver of the measuring instrument. The filters have separate, non-overlapping passbands and each include both a cavity portion and a solid dielectric portion.

In an embodiment, the cavity portion of each filter can include a pair of cavities 206(1), 206(2), 206(3), 226(1), 226(2), 226(3) with a resonator 208(1), 208(2), 208(3), 228(1), 228(2), 228(3) arranged within each cavity. A resonator in the filter is physically connected with a combiner point by a tap 210(1), 210(2), 210(3) a distance of substantially a quarter wavelength for the center frequency of the passband. The resonators of a filter are arranged apart from each other at a distance of substantially a quarter wavelength for a center frequency of the passband for which the filter is designed. Alternatively, each resonator can be connected at some other distance to the combiner point and/or the adjacent resonator that produces a short out of band, such as a distance of three-quarter wavelength for the center frequency of the passband of the filter. The combiner point combines tones F1, F2 into a test signal for output to a test port 212 via a transmission line 214 and can receive and pass a reflected signal 2F1-F2 corresponding to a third order harmonic of the test signal to the receiver.

The cavities and combiner point are formed in a metal block 202. Incident and reflected signals can be coupled from the transmission line and sampled at respective ports 216, 218 of the multiplexer, for example for use in measuring scattering (S–) parameters for a DUT. The metal block can comprise a bimetallic structure so as to increase the operating temperature range of the filters. Further, the metal block can be plated with a material selected to suppress the internal production of PIM.

The solid dielectric portion of each filter can be a discrete solid dielectric filter 220(1), 220(2), 220(3), such as a ceramic filter, connected with a cavity portion of the filter. As shown, pockets can be formed within the metal block for receiving the solid dielectric filters. The solid dielectric filters can be arranged other than as shown in FIG. 4, so long as the solid dielectric filters can be connected with the cavity portion by a transmission medium capable of communicating a signal having a frequency within a passband of the associated filter at an operating power of the measuring instrument. As will be appreciated by one skilled in the art in view of the teachings herein, the solid dielectric filters can be arranged in any configuration, provided that the solid dielectric filter can receive signals from and communicate signals to the cavity portion of an associated filter. For example, the solid dielectric filters can be stacked, reoriented, or otherwise reconfigured.

The solid dielectric filters can be connected with the measuring instrument at a pair of inlets 224(1), 224(2) and an outlet 224(3) via cables, or alternatively via any transmission medium capable of communicating a signal having a frequency within a passband of the filter and at an operating power of the measuring instrument.

As with the previously described embodiment, the cavity portion and the solid dielectric portion of each filter can be combined to provide improved isolation relative to a solid dielectric filter alone and relative to a typical combiner. A second tone generated by the second signal source of the measuring instrument and entering the combiner point will enter the cavity of the resonator of the first filter connected with the first signal source. Because the second tone is outside of the passband of the first filter, current will circulate in the resonator, and the second tone will be attenuated such that most of the second tone is rejected at the cavity portion of the first filter. The attenuated signal will then enter the adjacent cavity of the filter where it will be further attenuated. The second tone can be sufficiently attenuated such that the solid dielectric portion of the first filter will reject most of the remaining signal.

Figure 5:
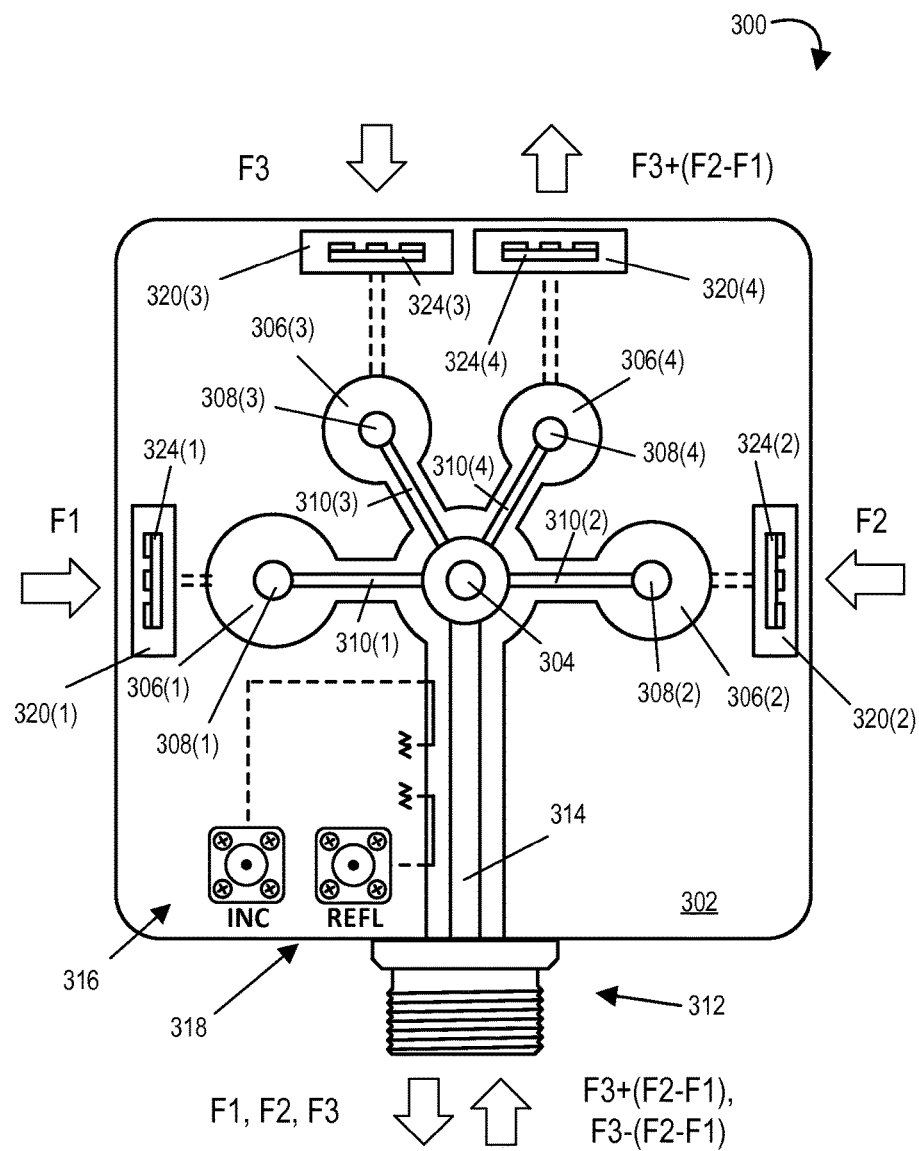
FIG. 5 illustrates an alternative embodiment of a multiplexer for use with an instrument for measuring an electrical response in a DUT, in accordance with the present invention.

FIG. 5 illustrates a multiplexer 300 for use with a measuring instrument, in accordance with a further embodiment. As shown, the multiplexer is a quadruplexer having a four-port to one-port configuration, but in other embodiments can have some other configuration. The multiplexer comprises three filters each connectable with a signal source of the measuring instrument and a filter for an output connectable with a receiver of the measuring instrument. The filters have separate, non-overlapping passbands and each include both a cavity portion and a solid dielectric portion.

In accordance with an embodiment, the cavity portion of each filter can include a single cavity 306(1), 306(2), 306(3), 306(4) with a resonator 308(1), 308(2), 308(3), 308(4) arranged within the cavity and connected with a combiner point 304, for example by a tap 310(1), 310(2), 310(3), 310(4). Each resonator is connected with the combiner point by a distance of substantially a quarter wavelength for the center frequency of the passband of the filter to which the resonator belongs. Alternatively, each resonator can be connected at some other distance that produces a short out of band, such as a distance of three-quarter wavelength for the center frequency of the passband of the filter. The combiner point combines tones F1, F2, F3 into a test signal for output to a test port 312 via a transmission line 314 and can receive and pass a reflected signal F3+(F2−F1) corresponding to a third order harmonic of the test signal to the receiver.

In accordance with an embodiment, the cavities and combiner point are formed in a metal block 302. Incident and reflected signals can be coupled from the transmission line and sampled at respective ports 316, 318 of the multiplexer, for example for use in measuring scattering (S–) parameters. The metal block can comprise a bimetallic structure so as to increase the operating temperature range of the filters. Further, the metal block can be plated with a material selected to suppress the internal production of PIM.

In accordance with an embodiment, the solid dielectric portion of each filter can be a discrete solid dielectric filter 320(1), 320(2), 320(3), 320(4), such as a ceramic filter, connected with a cavity portion. As shown, pockets can be formed within the metal block for receiving the solid dielectric filter. As will be appreciated by one skilled in the art in view of the teachings herein, the solid dielectric filters can be arranged in any configuration, so that the solid dielectric filter can receive signals from and communicate signals to the cavity portion of a filter. As shown, the solid dielectric filters can be connected with the measuring instrument via a waveguides 324(1), 324(2), 324(3), 324(4), or alternatively via any transmission medium capable of communicating a signal having a frequency within a passband of the filter and at an operating power of the measuring instrument.

As with the previously described embodiments, the cavity portion and the solid dielectric portion of each filter can be combined to provide improved isolation relative to a solid dielectric filter alone and relative to a typical combiner. A second tone generated by the second signal source of the measuring instrument and entering the combiner point will enter the cavity of the resonator of the first filter connected with the first signal source. Because the second tone is outside of the passband of the first filter, current will circulate in the resonator, and the second tone will be attenuated such that most of the second tone is rejected at the cavity portion of the first filter. The second tone can be sufficiently attenuated such that the solid dielectric portion of the first filter will reject most of the remaining signal.

It is noted that embodiments of systems and measuring instruments for performing methods described herein may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

The foregoing descriptions of the present invention have been presented for purposes of illustration and description. They are not intended to be exhaustive or to limit the invention to the precise forms disclosed. Many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. A device for combining two or more signals generated by a measuring instrument for output to a port, the device comprising:
 a combiner point;
 a transmission path extending from the combiner point to the port;
 two or more signal source filters having non-overlapping passbands, each adapted to be connected to a respective signal source of the measuring instrument;
 wherein each signal source filter is configured to communicate a signal having a frequency within a passband of that signal source filter from a signal source to the combiner point and includes
  a cavity,
  a resonator arranged within the cavity and connected with the combiner point at a distance such that the signal source filter is substantially an open circuit to a signal having a frequency within the passband of the signal source filter and substantially a short circuit to a signal having a frequency outside of the passband of the signal source filter, and
  a solid dielectric band-pass filter connected between the signal source and the cavity when the signal source filter is connected with the signal source,
  wherein the solid dielectric band-pass filter has a passband that substantially matches the passband of the signal source filter; and
 one or more receiver filters each adapted to be connected to a receiver of the measuring instrument;
 wherein each receiver filter is configured to communicate a signal having a frequency within a passband of that receiver filter from the combiner point to the receiver and includes
  a cavity,
  a resonator arranged within the cavity and connected with the combiner point at a distance such that the signal source filter is substantially an open circuit to a signal having a frequency within the passband of the receiver filter and substantially a short circuit to a signal having a frequency outside of the passband of the receiver filter, and
  a solid dielectric band-pass filter connected between the receiver and the cavity when the receiver filter is connected with the receiver,
  wherein the solid dielectric band-pass filter has a passband that substantially matches the passband of the receiver filter.

2. The device of claim 1, wherein the each resonator of the two or more signal source filters and the one or more receiver filters is arranged within a cavity and connected with the combiner point at a distance of one quarter of a wavelength of a signal comprising a center frequency of a passband of the cavity.

3. The device of claim 1, wherein the solid dielectric band-pass filter of each of the two or more signal source filters and the one or more receiver filters is a ceramic filter.

4. The device of claim 1, wherein the resonator is connected with the combiner point by a tap such that the combiner output impedance is 50 ohms.

5. The device of claim 1, further comprising:
 a body within which is formed the cavity of each of the two or more signal source filters and the one or more receiver filter;
 wherein the body further includes pockets for receiving the solid dielectric filter of each of the two or more signal source filters and the one or more receiver filter and through which the solid dielectric filter is connected with an associated cavity.

6. The device of claim 1, wherein the cavity of each of the two or more signal source filters and the one or more receiver filter is a first cavity and the resonator of each of the two or more signal source filters and the one or more receiver filter is a first resonator; and
 wherein each of the two or more signal source filters and the one or more receiver filter further includes
  a second cavity, and
  a second resonator arranged within the second cavity and at a distance from the first resonator of one quarter of a wavelength of a signal having a center frequency of the passband of the associated filter.

7. A device for combining two or more tones generated by a measuring instrument for output to a port, the device comprising:
 a combiner point;
 a transmission path extending from the combiner point to the port;
 a first signal source filter adapted to be connected to a first signal source of the measuring instrument;
 wherein the first signal source filter is configured to communicate a first signal having a frequency within a first passband from the first signal source to the combiner point and includes
  a cavity,
  a resonator arranged within the cavity and connected with the combiner point at a distance of one quarter of a wavelength of a signal having a center frequency of the first passband, and
  a solid dielectric band-pass filter connected between the first signal source and the cavity when the first signal source filter is connected with the first signal source,
  wherein the solid dielectric band-pass filter has a passband that substantially matches the first passband; and
 a second signal source filter adapted to be connected to a second signal source of the measuring instrument;
 wherein the second signal source filter is configured to communicate a second signal having a frequency within a second passband from the second signal source to the combiner point and includes
  a cavity,
  a resonator arranged within the cavity and connected with the combiner point at a distance of one quarter of a wavelength of a signal having a center frequency of the second passband, and
  a solid dielectric band-pass filter connected between the second signal source and the cavity when the second signal source filter is connected with the second signal source,
  wherein the solid dielectric band-pass filter has a passband that substantially matches the second passband; and
 a receiver filter adapted to be connected to a receiver of the measuring instrument;
 wherein the receiver filter is configured to communicate an intermodulation produced by the first signal and the second signal having a frequency within a third passband from the combiner point to the receiver and includes
  a cavity, a resonator arranged within the cavity and connected with the combiner point at a distance of one quarter of a wavelength of a signal having a center frequency of the third passband, and a solid dielectric band-pass filter connected between the receiver and the cavity when the receiver filter is connected with the receiver, wherein the solid dielectric band-pass filter has a passband that substantially matches the third passband.

8. The device of claim 7, wherein the solid dielectric band-pass filter of each of the two or more signal source filters and the one or more receiver filters is a ceramic filter.

9. The device of claim 7, wherein the resonator is connected with the combiner point by a tap such that the combiner output impedance is 50 ohms.

10. The device of claim 7, further comprising:

a body within which is formed the cavity of each of the first signal source filter, the second signal source filter and the receiver filter;

wherein the body further includes pockets for receiving the solid dielectric filter of each of the first signal source filter, the second signal source filter and the receiver filter and through which the solid dielectric filter is connected with an associated cavity.

11. The device of claim 7, wherein the cavity of each of the first signal source filter, the second signal source filter and the receiver filter is a first cavity and the resonator of each of the first signal source filter, the second signal source filter and the receiver filter is a first resonator; and wherein each of the first signal source filter, the second signal source filter and the receiver filter further includes a second cavity, and a second resonator arranged within the second cavity and at a distance from the first resonator of one quarter of a wavelength of a signal having a center frequency of the passband of the associated filter.

12. The device of claim 1, further comprising:

a body within which is formed the cavity of each of the two or more signal source filters and the one or more receiver filter;

wherein the body comprises a bimetallic block; and wherein the cavity of each of the two or more signal source filters and the one or more receiver filter is plated with a material selected to suppress the production of PIM internal to the cavities.

13. The device of claim 7, further comprising:

a body within which is formed the cavity of each of the two or more signal source filters and the one or more receiver filter;

wherein the body comprises a bimetallic block; and wherein the cavities formed in the body are plated with a material selected to suppress the production of PIM internal to the cavities.

* * * * *